US007007280B1

(12) United States Patent
Dermer

(10) Patent No.: US 7,007,280 B1
(45) Date of Patent: Feb. 28, 2006

(54) SCHEMA DRIVEN MANAGEMENT OF A COMPONENT-BASED APPLICATION

(75) Inventor: Richard A. Dermer, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 798 days.

(21) Appl. No.: 09/846,923

(22) Filed: Apr. 30, 2001

(51) Int. Cl.
*G06F 9/44* (2006.01)

(52) U.S. Cl. .................. 719/316; 719/315; 719/317
(58) Field of Classification Search ........ 719/310–320; 717/120–123
See application file for complete search history.

(56) References Cited

U.S. PATENT DOCUMENTS

| 5,428,791 | A  | * | 6/1995  | Andrew et al. | 717/121 |
|-----------|----|---|---------|---------------|---------|
| 2002/0087947 | A1 | * | 7/2002  | Kwon et al.   | 717/120 |
| 2002/0194578 | A1 | * | 12/2002 | Irie et al.   | 717/122 |
| 2003/0005412 | A1 | * | 1/2003  | Eanes         | 717/120 |
| 2003/0120678 | A1 | * | 6/2003  | Hill et al.   | 707/102 |
| 2003/0120688 | A1 | * | 6/2003  | Hill et al.   | 707/203 |
| 2003/0121024 | A1 | * | 6/2003  | Hill et al.   | 717/107 |
| 2004/0205689 | A1 | * | 10/2004 | Ellens et al. | 717/100 |

OTHER PUBLICATIONS

Green, "Component-Based Software Development: Implications for Documentation," Proceedings of the 17th Annual International Conference on Computer Documentation, 1999, pp. 159-164, ACM Press, New York, U.S.A.*

Helander et al., "MMLite: A Highly Componentized System Architecture," 1998, pp. 96-103, ACM Press, New York, U.S.A.*

Daniel et al., Active COM: An Inter-working Framework for CORBA and DCOM, IEEE 0-7695-0182-6/99, Jun. 1999, pp. 211-222.*

* cited by examiner

*Primary Examiner*—Majid Banankhah
(74) *Attorney, Agent, or Firm*—Fish & Richardson P.C.

(57) ABSTRACT

An assembly for processing a service used by a component-based application is provided by receiving a request from the component-based application that specifies a role name symbolizing the task, accessing an assembly data-structure corresponding to the role name and having metadata information specifying a number of components used to perform the service and interfaces used to connect each component with other components, loading a component identified in the assembly data-structure into an area for processing, connecting an interface associated with the loaded component to other components according to the meta-data information in the assembly data-structure, and performing the requested service using the loaded component to process data and the interface to pass information from the loaded component to other components.

32 Claims, 6 Drawing Sheets

SCHEMA DRIVEN MANAGEMENT OF A COMPONENT-BASED APPLICATION

BACKGROUND

This invention relates to software development techniques involving the use of components in a component-based application.

Component-based applications are built from building blocks of software called components. Each component corresponds to a function or set of functions that may be used and reused in different component-based applications. Instead of creating the software applications from scratch, component-based applications are created by combining these existing components, and possibly new components developed specifically for the application. For example, client/server applications can be created using separate components to process information on a server, transmit information from the server over a network to a client, and then interpret or interact with the information on the client. The component-based applications are easier to maintain in part because the components can be developed, analyzed, and tested in individual units.

The components must agree on certain protocols and communicate information to each other in a predetermined manner in the component-based application. Existing infrastructure technologies for object-oriented components to exchange information include Common Object Resource Broker Architecture (CORBA) and Microsoft's Component Object Model (COM) and Distributed Component Object Model (DCOM). Developers use these object-oriented technologies along with customized code to facilitate the communication and collaboration between the components. The object-oriented technologies provide a conduit for passing information between objects locally and over networks. Customized code created by the developers allows the components to gather information about other components and the component-based application being created. In conventional component-based systems, it is this customized code within each component that allows different components to work together.

Unfortunately, it is often difficult to modify one component used in a component-based application without modifying many other components. If the modified component processes information differently, other components that subsequently use the information may also require modification. In some instances, it may take too much development time to modify the many different components in a component-based application. Further, if the developer is an OEM (Original Equipment Manufacturer), the company supplying the components may not want to disclose all the source code to the OEM. The OEM is left with using the components in a component-based application exactly as they are provided or entering into a complex licensing and development contract with the supplying company. This requires the OEMs to work closely with companies supplying component-based applications to develop value-added components that meet the needs of the OEMs product line. Software is not modified without efforts of the company supplying the source-code and the OEMs development team. As a result, value-added enhancements made to existing component-based applications come with long development times and high costs.

SUMMARY

In one aspect of the present invention, a method and system is provided for organizing components to perform a service used by a component-based application. The operations for organizing the components includes selecting a role name symbolizing the service that the component-based application requests, grouping components together to perform the service wherein each component includes interfaces for communicating information with other components, and defining an assembly data-structure having the role name and metadata information identifying each component in the group of components and the connections used to connect the interfaces in each component with the other components used in performing the requested task. The component-based application can be modified to perform different services by adding or replacing such assembly data-structures and their components.

In another aspect of the present invention, a method and system for providing a component-based application access to a service is provided. The processing of a service includes receiving a request from the component-based application, or from a loaded component, that specifies a role name symbolizing the task, accessing an assembly data-structure corresponding to the role name and having metadata information specifying a number of components used to perform the service and interfaces used to connect each component with other components, wherein the interface facilitates communicating information between components, loading a component identified in the assembly data-structure into an area for processing, connecting an interface associated with the loaded component to other components according to the meta-data information in the assembly data-structure, and performing the requested service using the loaded component to process data and the interface to pass information from the loaded component to other components.

An additional aspect of the present invention also includes methods and systems for integrating components together to perform an existing service when one of the components is modified. The associated operations for integrating these components together include providing an assembly data-structure having metadata information specifying a number of components that work together to perform an existing service and a number of interfaces used to connect the components together and facilitate communication between the components, modifying one of the components, wherein the modified component alters the processing of information and renders the modified component and information incompatible with the other components associated with the existing task, creating a new component to filter information that passes through an interface connected to the modified component, and modifying the assembly data-structure to specify the new component and to indicate that the new component filter the information passing through the modified component, wherein the modified component and new component produce filtered information compatible with other components used by the existing task.

The details of one or more embodiments of the invention are set forth in the accompanying drawings and the description below. Other features of the invention will be apparent from the description and drawings, and from the claims.

DETAILED DESCRIPTION

A method and system is described for assembling components into component-based applications according to an assembly data-structure. Rather than customizing code in each component to load other components, the assembly data-structure determines the components required to perform a service or role requested by a component-based application or a loaded assembly and the relationships between the components. To modify a component-based application, assembly data-structures and their components can be added or replaced.

Figure 1A:
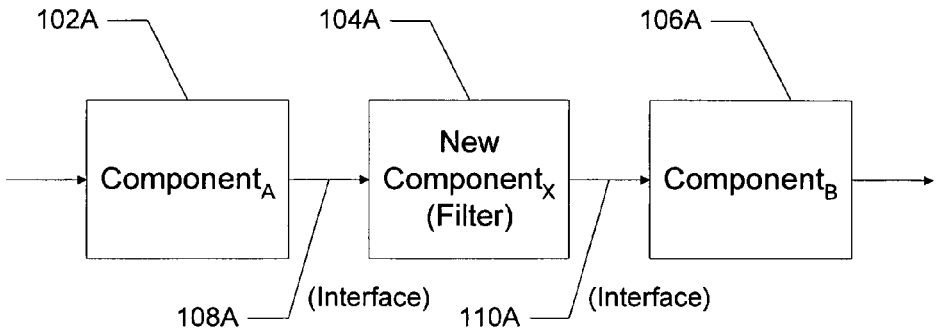
FIG. 1A is a block diagram that depicts the use of a filter component developed to interface between two existing components.

FIG. 1A is a block diagram illustrating the use of a filter component developed to interface between two existing components. FIG. 1A includes an existing component identified as component$_A$ 102A, a new component identified as component$_X$ 104A and another existing component referred to as component$_B$ 106A connected together by interface 108A and interface 110A. Using component$_X$ 104A facilitates communication between the other surrounding components.

In one implementation, component$_A$ 102A and component$_B$ 106A are the initial components of a component-based application. To modify the data processed by these initial components, the new component identified as component$_X$ 104A is placed between the existing components. This allows the developer to modify the information without directly modifying the actual code in the components. This is useful when a component is modified or when a new component is developed that may be incompatible with other components in a component-based application. For example, assume component$_A$ 102A and component$_B$ 106A cannot communicate with each other directly. A developer uses component$_X$ 104A to translate and filter information between the two components thereby allowing them to communicate. Component$_X$ 104A is considered for this purposes to be a server of interface 108A, also referred to as an ingoing interface, and a client of interface 110A, also referred to as an outgoing interface.

Figure 1B:
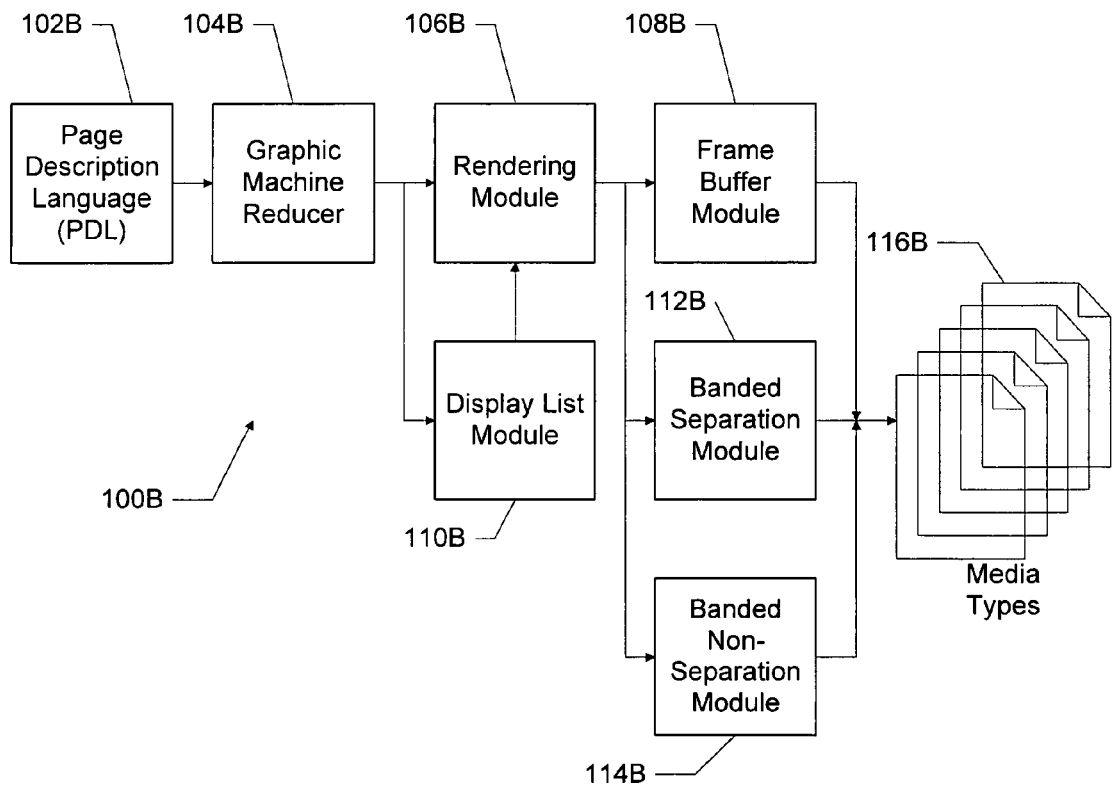
FIG. 1B is a block diagram representation of a component-based application used to process a page description language (PDL)

This method of using components to filter information and connect components is useful in developing large component-based applications that change over time. For example, FIG. 1B is a block diagram representation of a component-based application used to process a page description language (PDL). In one implementation, this PDL language can be the PostScript PDL developed by Adobe Systems Incorporated of Santa Clara. The component-based application 100B in FIG. 1B includes a PDL 102B, a graphic machine reducer 104B, a rendering module 106B, a display list 110B that works in parallel with rendering module 106B and provides information to frame buffer 108B, banded separation module 112B, and banded non-separation module 114B. These modules work together closely in processing data in PDL 102B into one of many media types 116B.

Over time, it may become necessary to change or replace components in component-based application 100B. For example, Original Equipment Manufactures (OEM) may want to replace or modify certain modules such as rendering module 106B to provide different functionality or accommodate a product produced by the OEM. In the past, this would require replacing rendering module 106B and then modifying or replacing other modules in component-based application 100B to accommodate different data formats and different information being processed. For example, callers (clients) of the modified component may need to be modified to invoke the new implementation, which may involve code changes or re-linking the application. This process is avoided, however, by replacing rendering module 106B and, if necessary, connecting it with a filtering component described in association with component$_X$ 104A in FIG. 1A. An assembly manager and assembly data-structure, as described in further detail below, determine which components are included and how they are connected together for processing.

Figure 2:
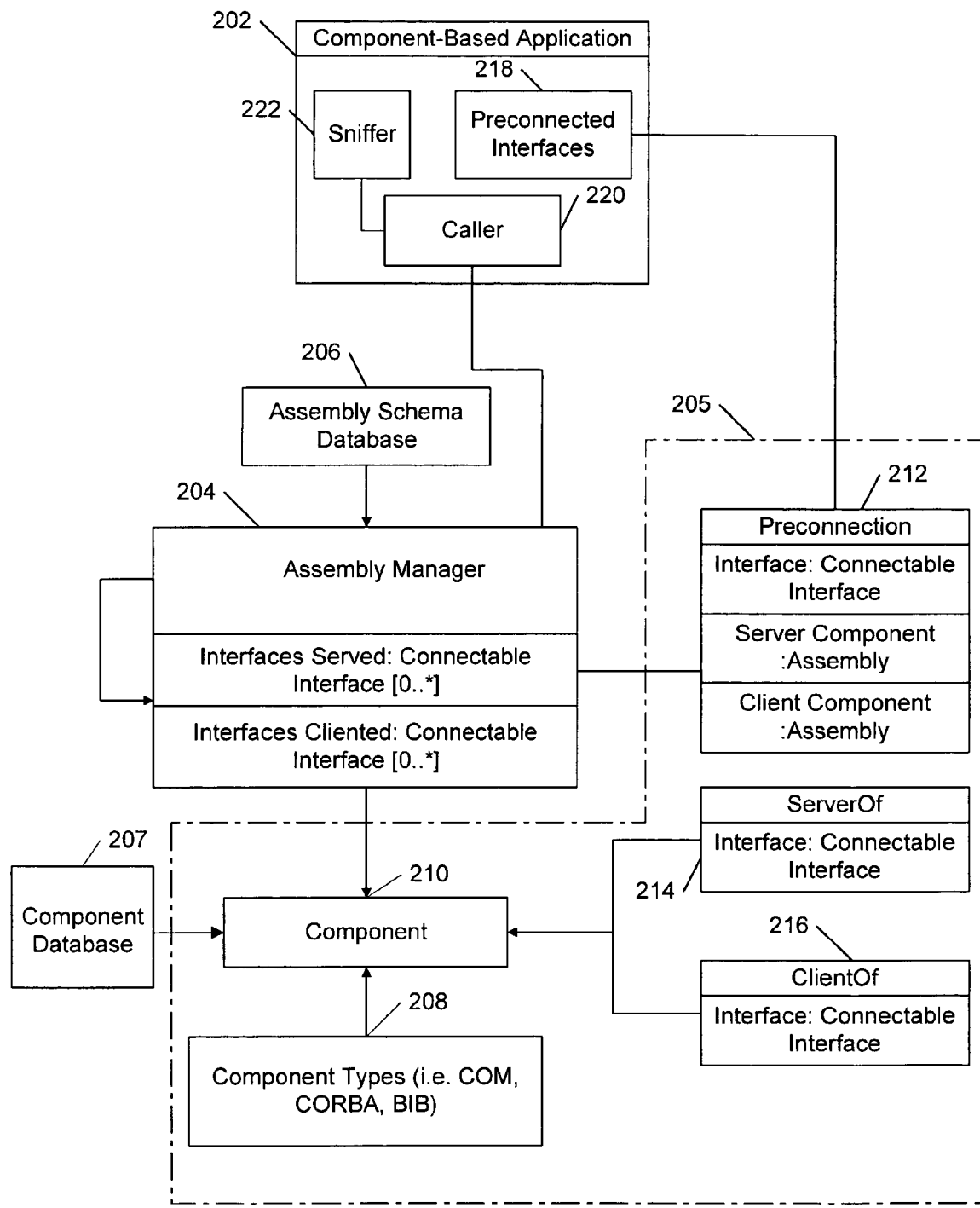
FIG. 2 is a block diagram representation of a software infrastructure for processing and assembling components for use in a component-based application.

FIG. 2 is a block diagram representation of a software infrastructure for processing and assembling components for use in a component-based application. The infrastructure and other software in FIG. 2 includes a component-based application 202, an assembly manager 204, a component database 207, and an assembly data-structure 205 that drives the assembling of components by assembly manager 204.

Component-based application 202 can be any application built from components of software or that invokes other applications built from components of software. Typically, component-based application 202 includes applications that have many discrete functions replaced or modified over time. For example, the system for processing a PDL in FIG. 1B is one component-based application that may benefit from the present invention because components can be modified and replaced without modifying and replacing every component. Many other applications could similarly benefit from the technology.

Assembly manager 204 performs the run-time assembly of components according to information in assembly data-structure 205. Using information in assembly data-structure 205, assembly manager performs late-binding of components to a component-based application. This allows the component-based application to be customized by inserting filtering components in the application or replacing components upon execution.

In one implementation, the assembly data-structure is generated in the Extensible Markup Language (XML) and is referred to as an assembly schema. One or more assembly data-structures are stored in an assembly schema database 206. Each assembly data-structure 205 uses a metadata syntax to describe the components assembly manager 204 loads to perform a service and the relationship each component assumes in this process.

When a component is loaded, the definition for the component is mapped to a factory that manufactures the specified object instance. The component definitions define which interfaces the components use and supply. The component definitions can have a cardinality attribute, which defines how many instances of the component object can be made. In one implementation, a component can have a cardinality of "1," indicating that only one object instance can be made, or a cardinality of "N," indicating that multiple object instances can be made.

The assembly data structure 205 also includes metadata describing interfaces that components use to communicate information with each other. In the Component Object Model (COM) architecture, interfaces are strongly-typed groupings of functions that serve as the binary standard through which components communicate. COM components perform reference counting to track when they are in use. Any client of an interface is responsible for incrementing the reference counter when a pointer to the interface is created and for decrementing the reference when the pointer to the interface is discarded. Interfaces can be used to communicate between components described in the same assembly or with components described in different assemblies. The Interfaces Served table and Interfaces Cliented Table associated with assembly manager 204 in FIG. 1 keeps track of the different interfaces between the components. As part of the component loading process, assembly manager 204 checks to ensure that interfaces in the Interfaces Served and Interfaces Cliented table are not left unconnected.

Component database 207 is a repository of components that assembly manager 204 combines together to provide a specified service. The components in the component database 207 are available to component-based application 202 from a local storage area or over a network connection on-demand or cached according to historical usage information. Initially, the components in the component database 207 are the components used in the original release of the application. Additional components are stored in the assembly and component database 207 as the original component-based application is enhanced, modified, and altered by OEMs and others. For example, the component database 207 may include multiple rendering nodules for performing rendering according to several different specifications to give OEM manufacturers alternative rendering options.

In one implementation, assembly data-structure 205 includes metadata describing a component 210, a component type 208, a preconnection table 212, a ServerOf table 214, and a ClientOf table 216. Component 210 in FIG. 2 represents one component used in a component-based application and can be developed using a variety of programming languages including Java, C, or C++. Interfaces associated with component 210 receive information from and transmit information to other components. Developers determine how interfaces are used by component 210 to communicate with other components depending on the services being performed and the type of information being exchanged between components for the particular task. In general, component 210 is characterized by the interfaces it implements and interfaces it uses from other components as a client.

The assembly manager 204 is designed to work with a variety of object models, including, for example, Component Object Model (COM) as specified by Microsoft, Corporation of Redmond, Wash., Common Object Request Broker Architecture (CORBA) a public object-model specified by Object Management Group (OMG), and Bravo Interface Builder (BIB) as specified by Adobe Systems Incorporated. In one implementation, the assembly manager operates on a base object model architecture and can support components based on other object model architectures that are adapted to interface with the base object model components. For example, if the assembly manager is based on the COM architecture, each component definition specifies a loader, which is responsible for returning an interface to non-COM components that look like COM components to the rest of the system.

Preconnection table 212 includes a list of interfaces in use by components already loaded in memory. Assembly manager 204 loads and connects new components to these interfaces as specified in ServerOf table 214 and ClientOf table 216 in assembly data-structure 205. More interface entries are made into preconnection table 212 as additional components are loaded by assembly manager 204. ServerOf table 214 specifies that the particular interface acts to connect the component as a server to another component. ClientOf table 216 specifies that the particular interface acts to connect the component as a client to another component.

In one implementation, the interfaces in the ServerOf table 214 have cardinality attributes. A cardinality of "1" indicates that the component can have one client connected on that interface, and a cardinality of "N" indicates that multiple clients can be connected on that interface. For interfaces in the ClientOf table 216, a cardinality of "1" indicates that the component can be connected to one server on that interface, and a cardinality of "N" indicates that the component can be connected to multiple servers on that interface.

Assembly manager 202 and assembly data-structure 205 are used together to perform numerous different operations with components and applications. These include loading and unloading components to provide a service specified by a component-based application, creating and registering components and assemblies in databases 206 and 207, and using additional components to filter and replace existing components in a component-based application.

Figure 3:
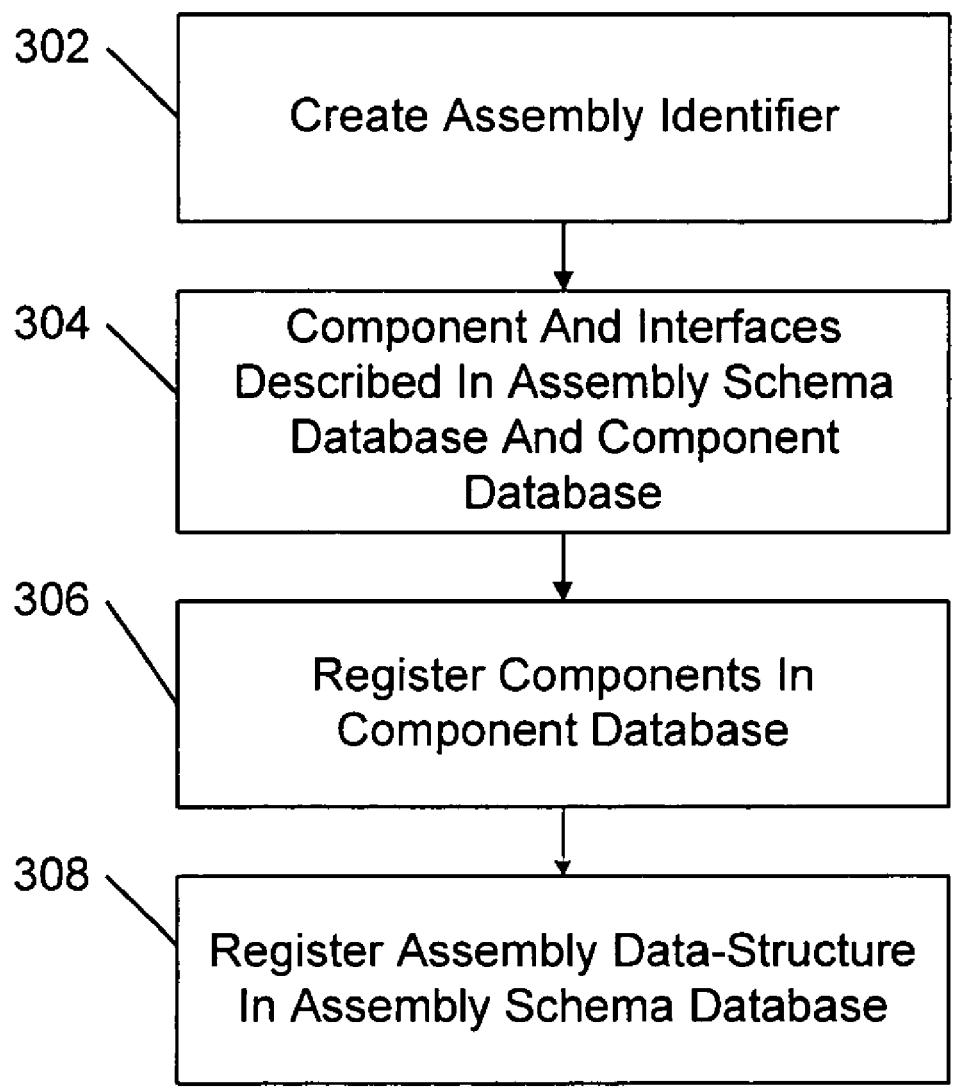
FIG. 3 is a flow-chart of the operations used to create an assembly data-structure for assembling components into a component-based application.

FIG. 3 provides the operations for creating an assembly data-structure and registering it in an assembly and component database. Initially, an assembly identifier label is created to identify a particular assembly data-structure (302). In one implementation, a component-based application includes a caller 220, which may be the component 210, that uses the assembly identifier when requesting that an assembly be loaded to provide a particular service. In other implementations, the caller requests a role name, which in turn is associated with the assembly identifier and assembly data-structure. Typically, a developer specifies a role name or an assembly identifier describing a certain service to be provided.

The assembly data-structure includes a listing of components and the interfaces used to communicate between the components (304). Components are grouped together in the assembly data-structure to provide a certain service. These components can also be included in other assembly data-structures to perform other services. The developer indicates the connections between each component in the assembly data-structure depending on the service required by that component. Any component referenced in the assembly data-structure must also be registered in the component database (306). The assembly manager can only load components if they are registered before they are requested by a component-based application. Once all the components are registered, the assembly data-structure is registered in the assembly schema database (308). The assembly data-structure has the role name and metadata information for identifying each component and the interfaces used to connect the different components together to provide a service. In one implementation, the components are contained in a local assembly and component database but in alternative implementation, components specified in an assembly data-structure can be stored locally and/or in remote databases.

Figure 4:
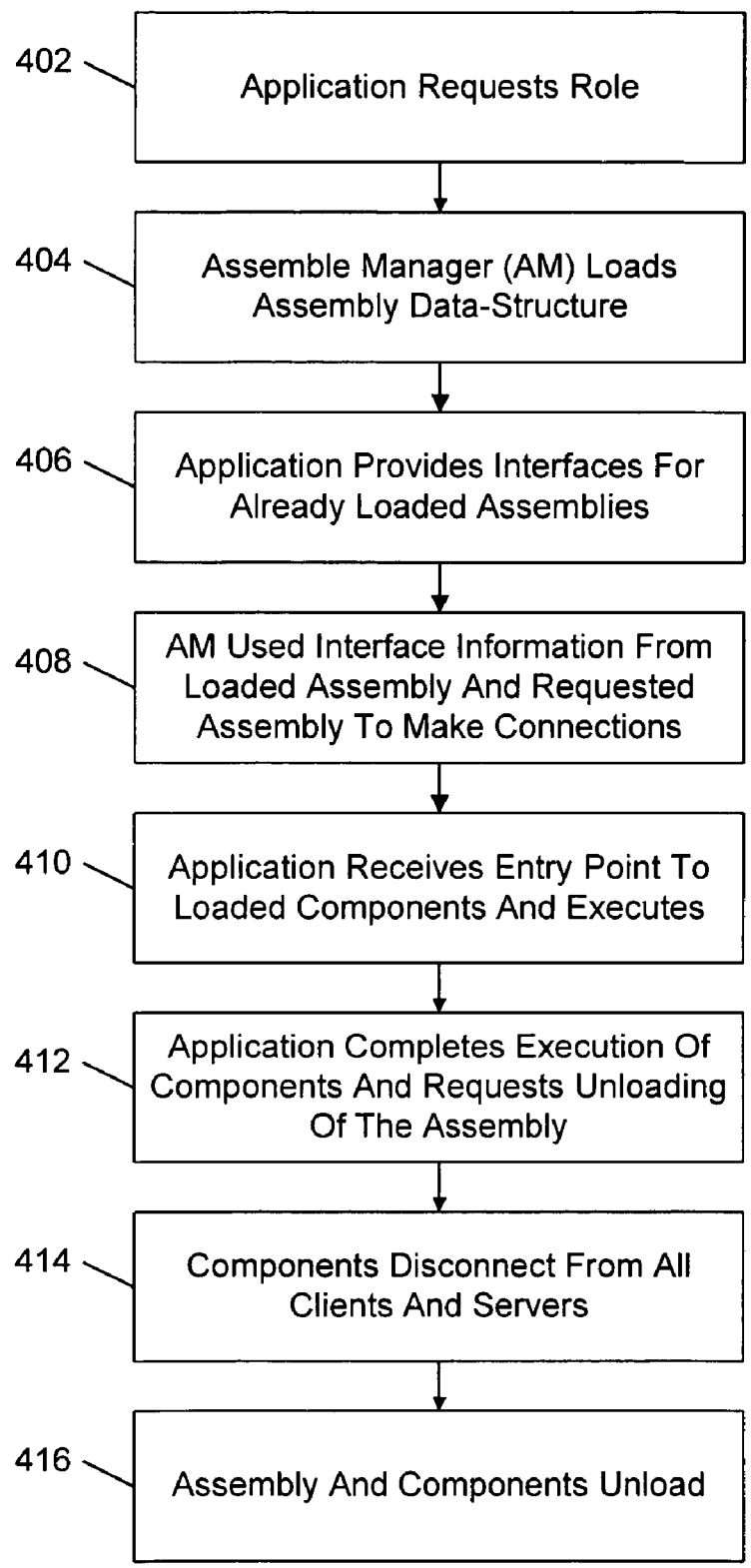
FIG. 4 is a flow-chart of the operations used load and unload a component-based application for providing a service.

FIG. 4 is a flow-chart of the operations used to load and unload a component-based application for providing a service. At some point during execution, a component-based application, or a loaded component, requests execution of a service (402). For example, the component-based application may process more than one PDL. The application includes a sniffer 222 that examines a file to be processed and determines the PDL for that file. The sniffer examines the contents of a stream of data from the file or an extension of the filename to determine the PDL. The sniffer returns a string corresponding to the PDL to the caller 220. The string may be an assembly name or role name associated with an assembly used to process that PDL. The caller uses the string to invoke the assembly manager.

The assembly manager receives the string and determines which assembly data-structure should be loaded. In some cases, the assembly manager receives a request directly from the application for an assembly data-structure having the proper components. In the former case, the assembly manager locates and loads the assembly data-structure created for processing the requested service (404). If there are other components already loaded, the component-based application can provide to the assembly manager the interfaces already loaded and in use by other components (406), subject to the cardinality attributes of the components and interfaces. The assembly manager connects the interfaces already loaded with interfaces of the components in the assembly data-structure (408).

Once the new components are properly loaded, the assembly manager provides the component-based application with an entry point to execute the components and perform the requested service (410). In an alternative implementation, the components are executed and the results are passed by the assembly manager to the component-based application that makes the request.

The component-based application requests that the components be unloaded after they are executed and results are obtained (412). Unloading these components includes removing these components from an area such as memory where they are executed and returning any other resources they may have used during execution. In addition, the components in the assembly are disconnected from the interfaces they were connected to, and thus from other components (414). This readies the interfaces to be connected by other components associated with a different requested service. Finally, the assembly data structure is also removed from memory or storage (416) thus completing the loading and unloading of components during execution.

Figure 5:
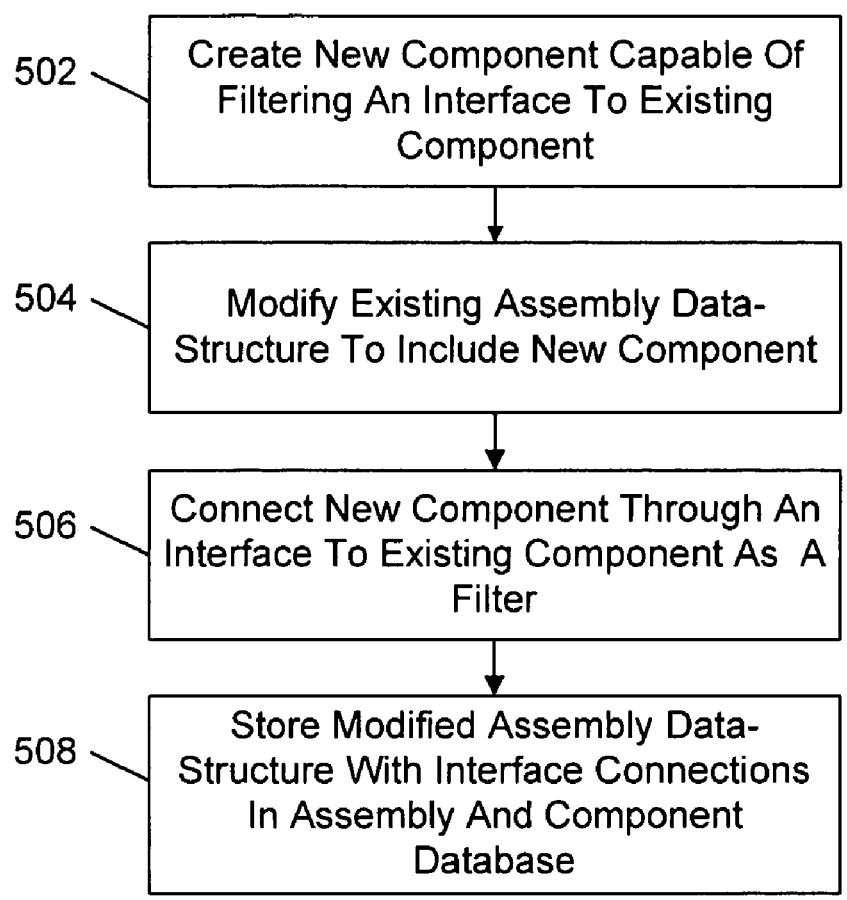
FIG. 5 is a flow-chart of the operations used to add a new component to an assembly data-structure that filters information from an existing component in the assembly data-structure.

FIG. 5 is a flow-chart of the operations used to add a new component to an assembly data-structure that filters information from an existing component in the assembly data-structure. The new component filters information produced when an existing component in the assembly data-structure is modified or replaced. Initially, a developer creates a new component capable of filtering the information from the existing components (502). The information is filtered to maintain compatibility with other components in the assembly data-structure that have not been modified or replaced. This new component is added to the assembly data-structure in addition to the existing components already defined in the assembly data-structure (504). As needed, the new component is connected to various components by specifying interface connections in the assembly data-structure (506). Finally, the assembly data-structure is stored in the assembly and component database for future reference (508).

A new assembly can reference an existing assembly as a sub-assembly, essentially treating the sub-assembly as a component. The new assembly data-structure identifies interfaces between components and the sub-assembly.

If the new assembly is created to replace the existing assembly (sub-assembly), the role name previously mapped to the existing assembly may be remapped to the new assembly.

Figure 6:
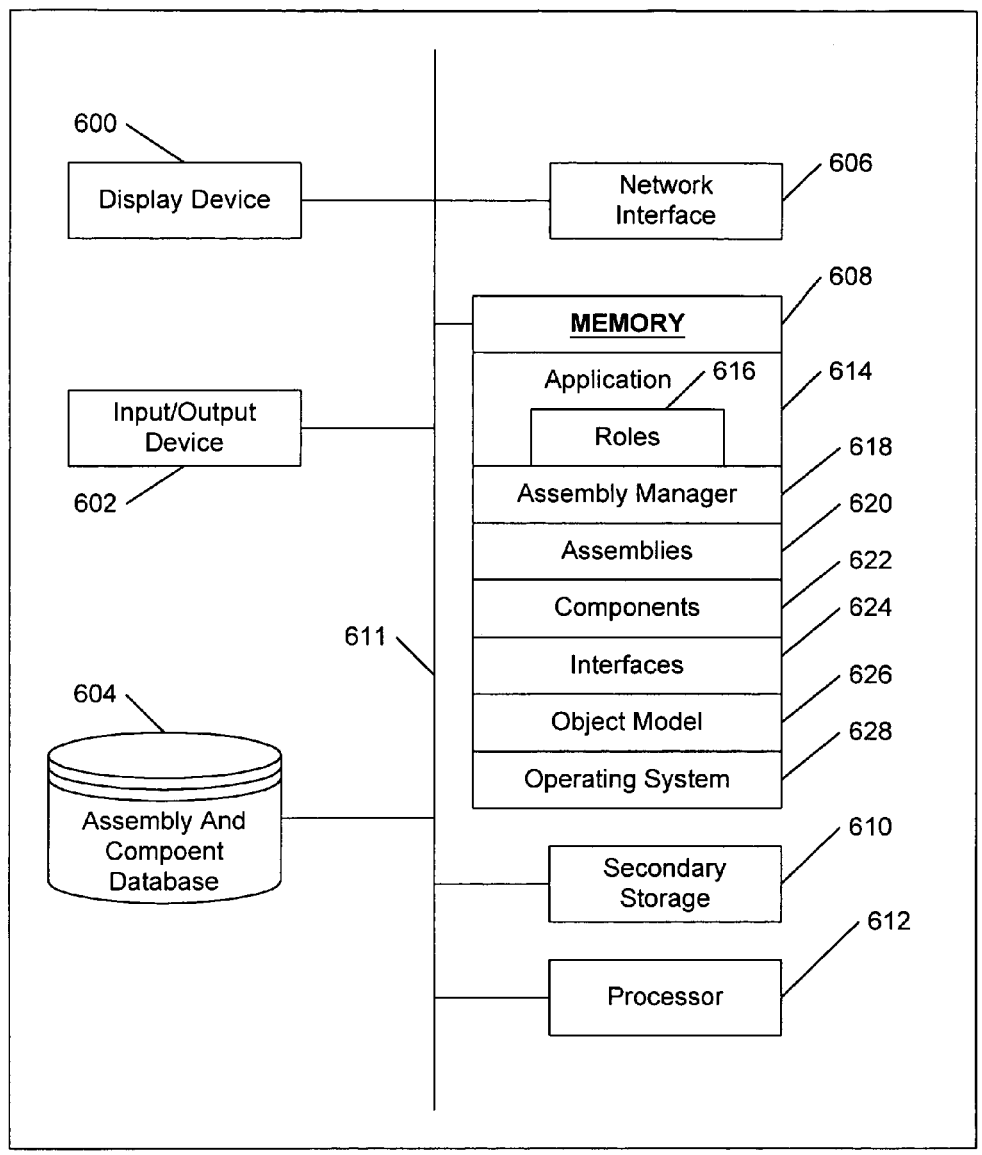
FIG. 6 is a block diagram representation of a system implementing a component-based application of the present invention.

FIG. 6 is a block diagram representation of a system implementing a component-based application of the present invention. This example implementation includes a display device 600, an input-output device 602, an assembly and component database 604, a network interface 606, a memory 608 capable of storing information and processes, a secondary storage area 610 that includes a CD-ROM or backup device, and a processor 612.

Display device 600 is any device used to display information to a user related to the processing of information on the system. Input-output device 602 includes devices used to provided and receive information to the computer such as keyboards, pointer devices (e.g., mouse), speakers and microphones. Assembly and component database 604 stores components and assembly data-structures previously described. Network interface 606 provides network connectivity between this system and other systems connected to this system over a network, which may include a Local Area Network (LAN), Wide Area Network (WAN), subnets, an intranet, or the Internet, or a combination of such networks.

Over a period of time, memory 608 may include a number of processes including a component-based application 614, a role 616, an assembly manager 618, assemblies 620, components 622, interfaces 624, object model 626, and operating system 628. Component-based application 614 requests role 616 which assembly manager 618 receives and processes. As previously described, assembly manager responds by loading assemblies 620, components 622, and interfaces 624 to perform the service. Object model 626 is used by assembly manager to manipulate components 622 while they are processing information. Operating system 628 can be Windows, Unix, or a real-time operating system that manages computing resources.

A number of embodiments of the invention have been described. Nevertheless, it will be understood that various modifications may be made without departing from the spirit and scope of the invention. Accordingly, other embodiments are within the scope of the following claims and the full-range of their equivalents.

What is claimed is:

1. A computer-implemented method of organizing components to provide access to a first service, comprising:

grouping components together to perform the first service, wherein each component implements an interface for communicating with an assembly manager; and defining a first assembly, the first assembly having a first name and a first assembly data-structure having metadata information identifying each component in the group of components and any further interfaces implemented by or used by any of the components the first assembly data-structure determining the components required to provide access to the first service and the relationships between the components, whereby the first assembly data-structure is configured to be loaded into the assembly manager, the assembly manager being operable to load and assemble the components at run-time according to the metadata information to provide access to the first service.

2. The computer-implemented method of claim 1, further comprising associating the first name of the first assembly with a role name associated with the first service.

3. The computer-implemented method of claim 1, further comprising:
grouping the first assembly with components to perform a second service; and
defining; a second assembly, the second assembly having a second name and a second assembly data-structure having metadata information identifying the first assembly and each component in the group of components and any further interfaces implemented by or used by the first assembly and any of the components, the second assembly data-structure determining the components required to provide access to the second service and the relationships between the first assembly and the components, whereby the second assembly definition data-structure is configured to be loaded into the assembly manager, the assembly manager being operable to load and assemble the components at run-time according to the metadata information to provide access to the second service.

4. The computer-implemented method of claim 1, further comprising:
modifying one of the components;
creating a new component to filter information that passes through an interface connected to the modified component; and
modifying the first assembly data-structure to specify the new component and an interface connecting the new component to the modified component, whereby the modified component and new component so connected produce filtered information compatible with other components in the first assembly.

5. The computer-implemented method of claim 4, wherein modifying the component alters the processing of information and renders the modified component and information incompatible with the other components in the first assembly.

6. The computer-implemented method of claim 1, wherein defining the first assembly comprises identifying client and server relationships between the components and interfaces.

7. The computer-implemented method of claim 1, wherein the first assembly data-structure is represented using Extensible Markup Language (XML).

8. The computer-implemented method of claim 1, wherein the components and interfaces comply with an object model architecture.

9. The computer-implemented method of claim 8, wherein the object-model is selected from a set of object-models including Component Object Model (COM), Bravo Interface Binder (BIB), and Common Object Request Broker Architecture (CORBA).

10. A computer-implemented method of providing access to a service by a component-based application, comprising:
receiving a request from the component-based application that identifies a service;
accessing an assembly data-structure associated with the service and having metadata information specifying a number of components used to perform the service and interfaces implemented by and used by the components, the assembly data-structure determining the components required to perform the service and the relationships between the components;
loading each component identified in the assembly data-structure into an area for processing; and
connecting an interface associated with each loaded component to other components according to the meta-data information in the assembly data-structure to form an assembly, whereby the application has access to an interface for communication with the assembly.

11. The computer-implemented method of claim 10, further comprising:
connecting interfaces identified in the assembly data-structure to the loaded components; and
connecting interfaces associated with components in the assembly data-structure but not identified in the assembly data-structure to the loaded components.

12. The computer-implemented method of claim 11, further comprising connecting interfaces in the assembly to components in a previously loaded assembly.

13. The computer-implemented method of claim 10, further comprising:
receiving an indication that the access to the requested service is not longer required;
disconnecting the interface from each component associated with the requested service; and
unloading each disconnected component and the corresponding assembly data-structure while the component-based application remains loaded.

14. A computer-implemented method for gaining access to a service, comprising:
identifying a service for processing data;
calling an assembly manager with a service request corresponding to the service, the assembly manager determining an assembly that is capable of performing the service; and
accessing the assembly, the assembly including components and interfaces specified in an assembly data-structure and loaded by the assembly manager, the assembly data-structure determining the components required to perform the service and the relationships between the components, the assembly manager being operable to assemble the components at run-time according to information in the assembly data-structure to perform the service.

15. The computer-implemented method of claim 14, wherein the service request comprises a name associated with the assembly data-structure.

16. The computer-implemented method of claim 14, wherein the service request comprises a role name associated with the service.

17. A computer program product, tangibly stored on a computer-readable medium, for organizing components to provide access to a first service, the product comprising instructions operable to cause a programmable processor to:
group components together to perform the first service, wherein each component implements an interface for communicating with an assembly manager; and
define a first assembly, the first assembly having a first name and a first assembly data-structure having metadata information identifying each component in the group of components and any further interfaces implemented by or used by any of the components, the first assembly data-structure determining the components required to provide access to the first service and the relationships between the components, whereby the first assembly data-structure is configured to be loaded into the assembly manager, the assembly manager being operable to load and assemble the components at run-time according to the metadata information to provide access to the first service.

18. The product of claim 17, further comprising instructions operable to cause the processor to associate the first name of the first assembly with a role name associated with the first service.

19. The product of claim 17, further comprising instructions operable to cause the processor to:
group the first assembly with components to perform a second service; and
define a second assembly, the second assembly having a second name and a second assembly data-structure having metadata information identifying the first assembly and each component in the group of components and any further interfaces implemented by or used by the first assembly and any of the components, the second assembly data-structure determining the components required to provide access to the second service and the relationships between the first assembly and the components, whereby the second assembly data-structure is configured to be loaded into the assembly manager, the assembly manager being operable to load and assemble the components at run-time according to the metadata information to provide access to the second service.

20. The product of claim 17, further comprising instructions operable to cause the processor to:
modify one of the components;
create a new component to filter information that passes through an interface connected to the modified component; and
modify the first assembly data-structure to specify the new component and an interface connecting the new component to the modified component, whereby the modified component and now component so connected produce filtered information compatible with other components in the first assembly.

21. The product of claim 20, wherein modifying the component alters the processing of information and renders the modified component and information incompatible with the other components in the first assembly.

22. The product of claim 17, wherein the instructions operable to cause the processor to define the first assembly comprise instructions operable to cause the processor to identify client and server relationships between the components and interfaces.

23. The product of claim 17, wherein the first assembly data structure is represented using Extensible Markup Language (XML).

24. The product of claim 17, wherein the components and interfaces comply with an object model architecture.

25. The product of claim 24, wherein the object-model is selected from a set of object-models including Component Object Model (COM), Bravo Interface Binder (BIB), and Common Object Request Broker Architecture (CORBA).

26. A computer program product, tangibly stored on a computer-readable medium, for organizing components to provide access to a service by a component-based application, the product comprising instructions operable to cause a programmable processor to:
receive a request from the component-based application that identifies a service;
access an assembly data-structure associated with the service and having metadata information specifying a number of components used to perform the service and interfaces implemented by and used by the components, the assembly data-structure determining the components required to perform the service and the relationships between the components;
load each component identified in the assembly data-structure into an area for processing; and
connect an interface associated with each loaded component to other components according to the meta-data information in the assembly data-structure to form an assembly, whereby the application has access to an interface for communicating with the assembly.

27. The product of claim 26, further comprising instructions operable to cause the processor to:
connect interfaces identified in the assembly data-structure to the loaded components; and
connect interfaces associated with components in the assembly data-structure but not identified in the assembly data-structure to the loaded components.

28. The product of claim 27, further comprising instructions operable to cause the processor to connect interfaces in the assembly to components in a previously loaded assembly.

29. The product of claim 26, further comprising instructions operable to cause the processor to:
receive an indication that the access to the requested service is not longer required;
disconnect the interface from each component associated with the requested service; and
unload each disconnected component and the corresponding assembly data-structure while the component-based application remains loaded.

30. A computer program product, tangibly stored on a computer-readable medium, for gaining access to a service, the product comprising instructions operable to cause, a programmable processor to:
identify a service for processing data;
call an assembly manager with a service request corresponding to the service, the assembly manager determining an assembly that is capable of performing the service; and
access the assembly, the assembly including components and interfaces specified in an assembly data-structure and loaded by the assembly manager, the assembly data-structure determining the components required to perform the service and the relationships between the components, the assembly manager being operable to assemble the components at run-time according to information in the assembly data-structure to perform the service.

31. The product of claim 30, wherein the service request comprises a name associated with the assembly data-structure.

32. The product of claim 30, wherein the service request comprises a role name associated with the service.

* * * * *

UNITED STATES PATENT AND TRADEMARK OFFICE
CERTIFICATE OF CORRECTION

| | |
|---|---|
| PATENT NO. | : 7,007,280 B1 |
| APPLICATION NO. | : 09/846923 |
| DATED | : February 28, 2006 |
| INVENTOR(S) | : Richard A. Dermer |

It is certified that error appears in the above-identified patent and that said Letters Patent is hereby corrected as shown below:

Column 8, line 58, after "components", insert a comma;
Column 9, line 8, after "defining", delete the semicolon;
       line 18, delete "definition";
Column 10, line 5, delete "communication" and insert --communicating--;
Column 11, line 33, delete "now" and insert --new--.

Signed and Sealed this

First Day of August, 2006

JON W. DUDAS
*Director of the United States Patent and Trademark Office*